(12) United States Patent
Pham

(10) Patent No.: US 12,083,725 B2
(45) Date of Patent: Sep. 10, 2024

(54) INJECTION MOLDING APPARATUS AND METHOD OF EXTERNAL INDUCTION HEATING WITH ALTERNATING INSERT PLATES

(71) Applicant: Minh Son Pham, Ho Chi Minh (VN)

(72) Inventor: Minh Son Pham, Ho Chi Minh (VN)

(73) Assignee: HCMC UNIVERSITY OF TECHNOLOGY AND EDUCATION, Ho Chi Minh (VN)

(*) Notice: Subject to any disclaimer, the term of this patent is extended or adjusted under 35 U.S.C. 154(b) by 0 days.

(21) Appl. No.: 17/812,174

(22) Filed: Jul. 12, 2022

(65) Prior Publication Data

US 2024/0025098 A1  Jan. 25, 2024

(51) Int. Cl.
| | | |
|---|---|---|
| *B29C 45/73* | (2006.01) | |
| *B29C 35/08* | (2006.01) | |
| *B29C 45/04* | (2006.01) | |
| *B29C 45/26* | (2006.01) | |
| *B29C 45/40* | (2006.01) | |
| *B29K 55/02* | (2006.01) | |

(52) U.S. Cl.
CPC .......... *B29C 45/73* (2013.01); *B29C 35/0805* (2013.01); *B29C 45/0441* (2013.01); *B29C 45/2681* (2013.01); *B29C 45/40* (2013.01); *B29C 2035/0816* (2013.01); *B29K 2055/02* (2013.01)

(58) Field of Classification Search
CPC . B29C 45/73; B29C 45/0441; B29C 45/2681; B29C 45/40; B29C 35/0805; B29C 2035/0816; B29K 2055/02
See application file for complete search history.

(56) References Cited

U.S. PATENT DOCUMENTS

| | | | | |
|---|---|---|---|---|
| 3,983,196 A | * | 9/1976 | Gray | B29C 45/561 264/DIG. 83 |
| 4,678,420 A | * | 7/1987 | Inoue | B29C 45/18 425/149 |
| 6,447,280 B1 | * | 9/2002 | Grimm | B29C 45/1628 425/572 |
| 2016/0151985 A1 | * | 6/2016 | Iatan | F21V 7/0091 264/1.7 |
| 2021/0308918 A1 | * | 10/2021 | Niewels | B29C 49/5603 |

* cited by examiner

*Primary Examiner* — Alison L Hindenlang
*Assistant Examiner* — Erica Hartsell Funk

(57) ABSTRACT

An injection molding apparatus and method are provided, comprising: a core plate having a male protrusion; a cavity plate having a female cavity configured to be mated with the male protrusion; a first insert plate; a second insert plate connected to the first insert plate by a rotating arm; a motor; connected to the rotating arm, operable to rotate the first insert plate and the second insert plate in and out of the female cavity of the cavity plate; and an induction heating device, positioned outside of the cavity plate, operable to cause an induction current on a surface of either the first insert plate or the second insert plate when either are rotated outside of the female cavity.

20 Claims, 12 Drawing Sheets

INJECTION MOLDING APPARATUS AND METHOD OF EXTERNAL INDUCTION HEATING WITH ALTERNATING INSERT PLATES

FIELD OF THE INVENTION

The present disclosure is generally related to the injection molding and more specifically to microinjection molding.

BACKGROUND ART

In recent years, the injection molding process has undergone many improvements to satisfy the demands for thinner, smaller products or for molding with a low-flow material. Due to its low cost and the capacity for high-volume production, thin-wall and microinjection molding is used to manufacture a variety of polymer components. Most applications of thin-wall and microinjection molding are in the micro-optics and microfluidic devices market. The developments of micro-optical parts of various shapes are ongoing[. These developments include optical gratings, optical switches, and waveguides [1-4], as well as a variety of molded microfluidic devices, including pumps, capillary analysis systems, and lab-on-a-chip (LOC) applications [5,6]. Related to the melt flow in the cavity, the appearance of a frozen layer is the main reason for a reduction in the filling ability.

To address this challenge, a number of methods have been tested, with the aim of reducing the filling pressure [7] and the viscosity of the melt material [8-10] or increasing the filling speed. When the aim was to increase the filling pressure, a high injection pressure was entailed. The experiment showed that the melt flow length was improved. However, to satisfy the requirements of a high filling pressure and high filling speed, the optimization of the injection molding process still needs to be investigated. In addition, the mold structure should also be given further attention due to the ease with which flash problems can occur. There is some existing research about additives for improving the quality of parts. However, to increase the melt flow length by this method, a higher material cost is incurred; on the other hand, in some cases, the molding material is fixed by the customers in the specifications. In order to reduce the frozen layer, the use of a high mold temperature has yielded good results in reducing the filling pressure and clearly improving the melt flow length [11-13]. According to research on mold temperature control [14-18], the temperature is a crucial aspect of plastic manufacturing in the field of injection molding. The quality of the part is improved with a high mold surface temperature, although with undesirable increases in both the cooling time and the cycle time. Decreasing the temperature of the mold surface reduces cooling time, but there is no benefit in terms of the surface quality of the product [19-21].

In recent research, therefore, it has been noted that a crucial requirement is to raise the temperature of the mold surface while minimizing the cycle time. To achieve this aim, there are many methods for increasing the cavity temperature. The most popular method is to use a higher-temperature fluid such as hot water or hot oil, which flows inside the cooling channel. This method could control the mold temperature when the target temperature is lower than 100° C. [22-25]. When the heating target is higher than 100° C., local mold heating with electric heaters has been suggested [25]. In addition, some heating methods were suggested such as heating by heaters [17,26,27] and heating by steams [28,29]. Both methods involve hot fluid flow inside the cooling channel and heater's heating such that the core or cavity plate is heated. This is a disadvantage of these heating methods, which leads to a low heating rate as well as energy wastage.

Therefore, to address this issue, instead of heating the entire volume of the mold plate, recent research has suggested new heating methods in which only the cavity surface is heated. To achieve this, many methods for mold heating have been suggested, such as hot gas heating [30-33], induction heating [34,35], and infrared heating [36-38]. These methods could support high mold temperatures for improving the melt flow length by reducing the amount of frozen layer formed during melt flow. However, despite achieving the target of reducing both the heating time and thermal energy wastage, the heating time was not adequately minimized. In general, when raising the cavity surface temperature to that of the glass temperature of the plastic material, the required heating time is around 10 seconds or longer [31-38]. This means that the molding cycle time is longer than the traditional cycle of around 10 seconds. In many occasions, it significantly exceeds 10 seconds.

Therefore, what is needed is a heating method and an injection molding apparatus for raising the cavity temperature without requiring a long heating time, and without consuming a lot of energy.

What is needed is an injection molding apparatus and a heating method that improves the overall production efficiency;

What is needed is a heating method and an injection molding apparatus that do not result in high emissions.

What is needed is an injection molding apparatus and a heating method that do not significantly impact the cycle time.

What is needed is a heating method and an injection molding apparatus that improves the melt flow length.

The injection molding apparatus and the heating method of the present invention meets the above needs and solve the above problems.

SUMMARY OF THE INVENTION

Embodiments described herein can also be said broadly to relate to the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

An object of the present invention is to provide an injection molding apparatus and method, comprising: a core plate having a male protrusion; a cavity plate having a female cavity configured to be mated with the male protrusion; a first insert plate; a second insert plate connected to the first insert plate by a rotating arm; a motor; connected to the rotating arm, operable to rotate the first insert plate and the second insert plate in and out of the female cavity of the cavity plate; and an induction heating device, positioned outside of the cavity plate, operable to cause an induction current on a surface of either the first insert plate or the second insert plate when either are rotated outside of the female cavity.

Another object of the present invention is to provide a heating method and injection molding apparatus for raising the cavity temperature without requiring a long heating time, and without consuming a lot of energy.

An object of the present invention is to provide an injection molding apparatus and heating method that improves the production efficiency;

An object of the present invention is to provide a method and an injection molding apparatus that do not result in high emissions.

An object of the present invention is to provide an injection molding apparatus and a heating method that do not significantly impact the cycle time.

An object of the present invention is to provide a heating method and an injection molding apparatus that improves the melt flow length.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

Figure 1:
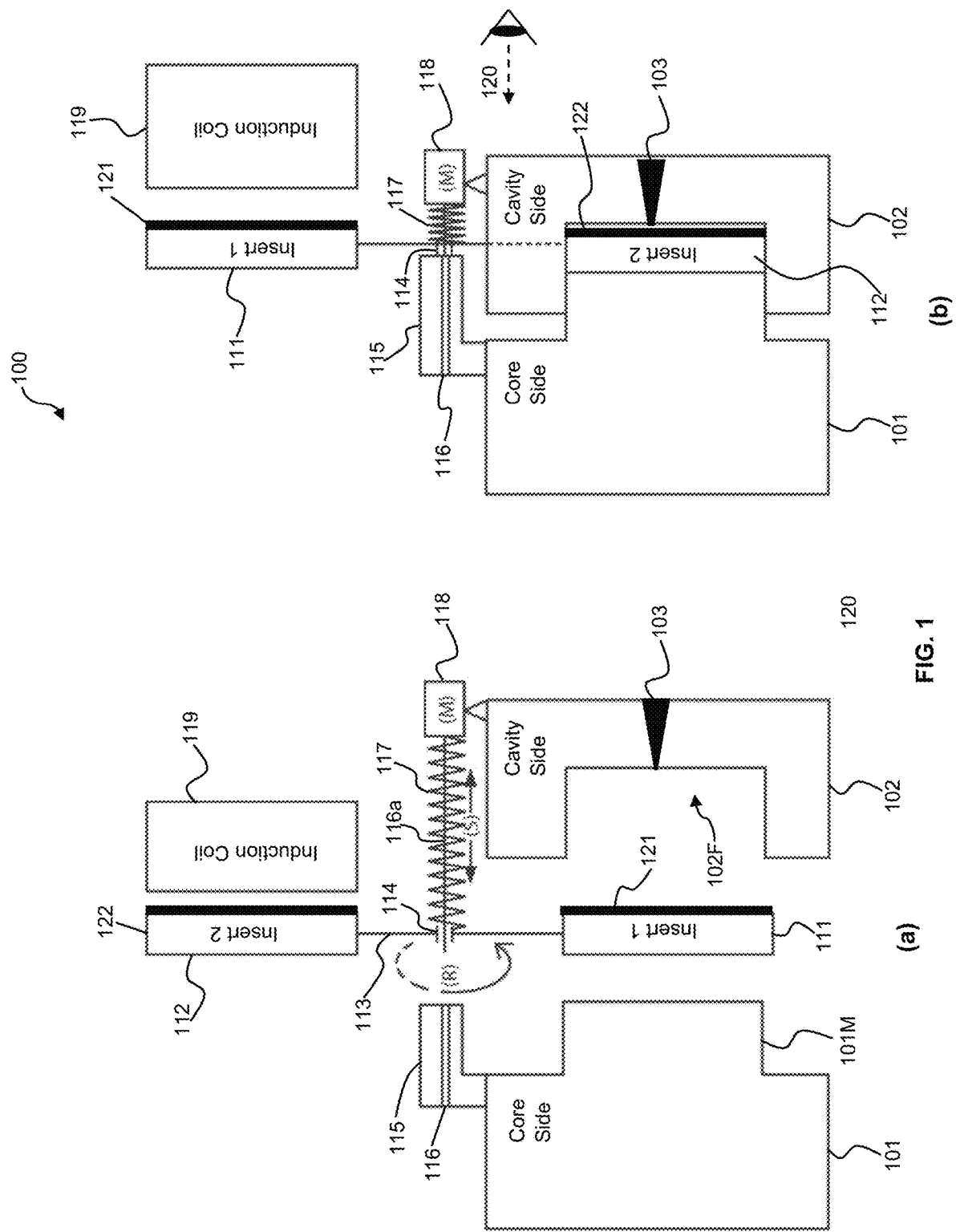
FIG. 1A-FIG. 1B show block diagrams of an injection molding apparatus in (a) an open cycle and (b) in the close cycle respectively in accordance with an exemplary embodiment of the present invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Referring now to FIG. 1A-FIG. 1B, an injection molding apparatus 100 in a complete cycle in accordance with an exemplary embodiment of the present invention is illustrated. Injection molding apparatus 100 of the present invention includes a core plate 101 containing a male protrusion 101M, a cavity plate 102 containing a female cavity 102F, an injection site (injection screw or plunger system) 103 where injection materials such as ABS is injected. Injection materials include acrylonitrile butadiene styrene (ABS), polycarbonate (PC), polyamide 6.6 (PA 6.6), polyoxymethylene (POM), other polymer materials such as polystyrene (PS), cyclic olefin copolymer (COC), poly methyl methacrylate (PMMA), polypropylene (PP), polysulfone (PSU), liquid crystal polymer (LCP), polybuty (PSU), polysulfone (PSU), polyphenyl ether (PPE), polybutylene terephthalate (PBT), and liquid silicone rubber (LSR). Next, injection molding apparatus 100 also includes a block 115 affixed on top of core plate 101. Block 115 includes a slide tunnel 116 where a slide track 116a goes through in the pressing cycle. Slide track 113 is encircled by a spring 117 whose one end is connected to a pivot 114 and the other end connected to a motor 118. Pivot 114 is connected to a rotating arm 113 and to spring 117. One end of rotating arm 113 is connected to a first insert plate 111. The other end of rotating arm 113 is connected to a second insert plate 112. First insert plate 111 and second insert plate 112 are rotated by motor 118 via pivot 114. First insert 111 and second insert 112 are alternately rotated into the cavity of cavity plate 102. An induction coil 119 is positioned next to either first insert plate 111 or second insert plate 112. A first mold pattern 121 is connected to first insert plate 111. A second mold pattern 122 is connected to second insert plate 112. First mold pattern 121 and second mold pattern 122 can be different or they can be the same. They can be micro patterns used to produce micro devices such as micro-nanostructured polymer. Alternatively, they (first molding pattern 111 and second mold pattern 112) can be regular injection molding patterns.

Figure 2:
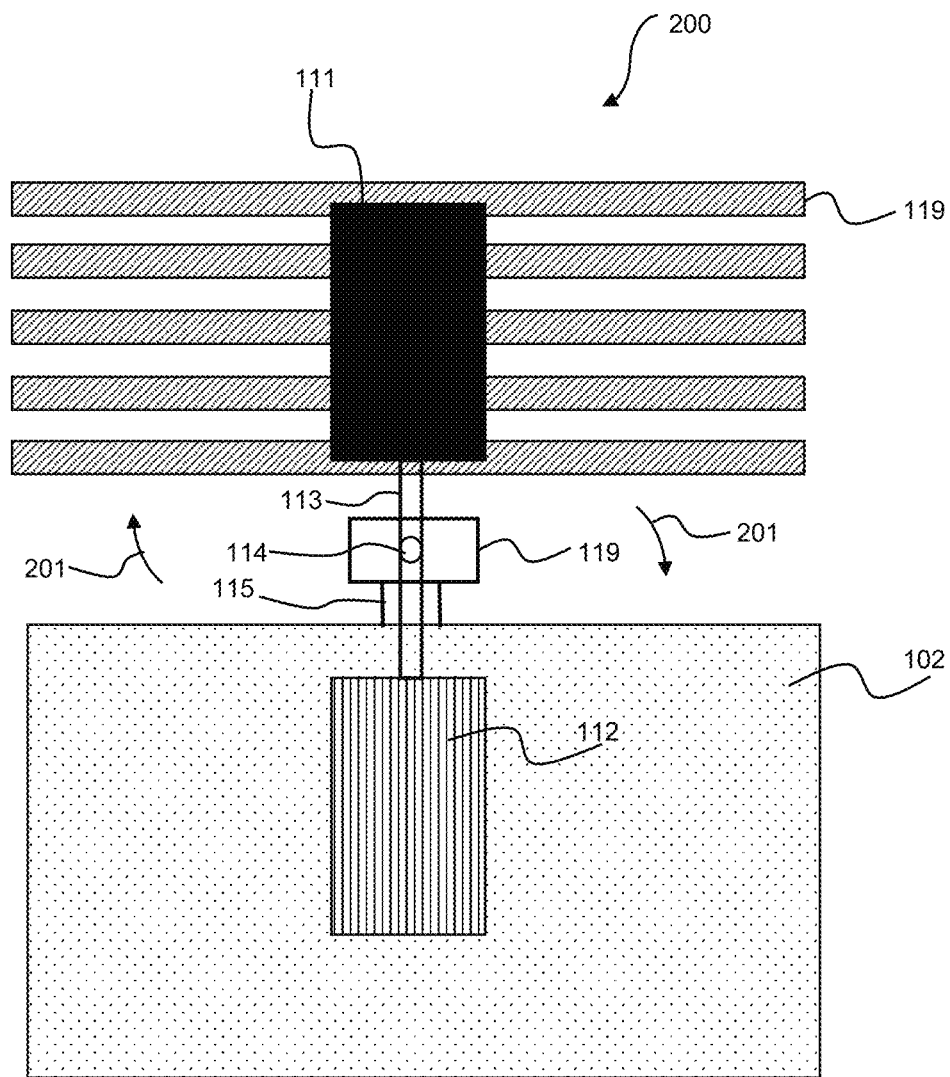
FIG. 2 shows a facade view of the injection molding apparatus in accordance with an exemplary embodiment of the present invention.

A side view 120 of injection molding apparatus 100 of the present invention is presented in FIG. 2. Side view 120 shows a rotational apparatus 200 in accordance with an exemplary embodiment of the present invention. Rotational apparatus 200 includes first insertion plate 111 is positioned next to induction coil 119 represented by parallel lines. Second insertion plate 112 is positioned inside injection plate 102. First insertion plate 111 and second insertion plate 112 are rotated in a direction 201 either clockwise or counterclockwise at pivot 114 by motor 119.

Referring back to FIG. 1A and FIG. 2, in operation, in a first cycle, induction coil 119 causes an induction current (e.g., Eddy's current) to flow on the thin surface of second insert 112. As second insert 112 is heated up by the induced Eddy's current, motor 118 causes second insert plate 112 is rotated in direction 201 to cavity plate 102 while first insert plate 111 is rotated back up to be heated by induction current caused by induction coil 119. Next, motor 119 causes spring 117 to retract and slide core plate 101 to mate and press second insert plate 112. In this position, slide bar 116b is inserted into slide tunnel 116, compressing spring 117. Next, injection materials listed above is injected into injection site 103. The heated second insert plate 112 achieves the following objects of the present invention.

(a) raising the cavity temperature without requiring a long heating time, and without consuming a lot of energy.
   a heating method that improves the production efficiency,
      an injection molding apparatus that do not result in high emissions.
   a heating method that do not significantly impact the cycle time.
   an injection molding apparatus that improves the melt flow length.

Continuing with FIG. 1B and FIG. 2, next, when second molding pattern 122 is completed, core plate 102 is pushed out by motor 118, spring 117 is expanded. Slide track 116a is retracted out of tunnel 116 via pivot 114, separating core plate 101 and cavity plate 102. During the formation of second molding pattern 112, first insert plate 111 was heated up by the induction current of induction coil 119. Now, motor 118 rotates first insertion plate 111 down to cavity plate 102. And the process of the present invention continues. In the present invention, rotational apparatus 200 eliminates the need to heat up insert plate while compressing and injecting molding materials.

Figure 3:
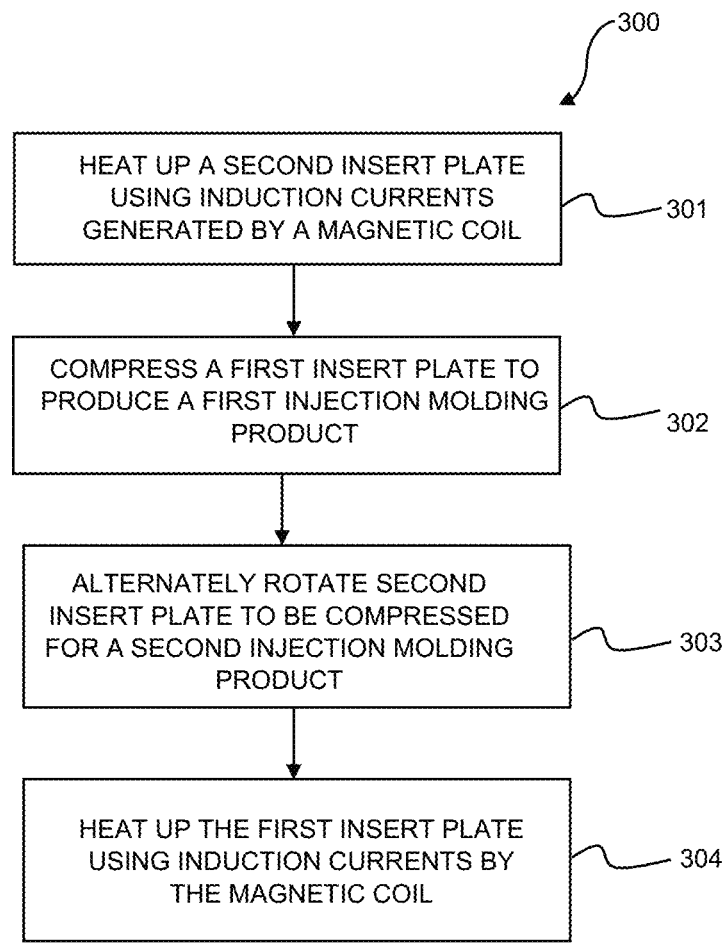
FIG. 3 shows a flow chart of a heating method in an injection molding apparatus in accordance with an exemplary embodiment of the present invention.

Next referring to FIG. 3, a flow chart of a method 300 for achieving molt flow length of ABS thin walled injection molding apparatus in accordance with an exemplary embodiment of the present invention is illustrated. Method 300 is implemented by rotational apparatus 200 described above.

At step 301, a second insert plate is heated up using an induction current. In many preferred aspects of the present invention, step 301 is realized by rotational apparatus 200. Second insertion plate 112 is heated up by the Eddy currents induced by induction coil 119. The induced Eddy's currents are well-known in the art and needs not to be explained in details herewith.

At step 302, at the same time, the heated first insert plate is compressed to produce the first injection molding product. The realization of step 302 is achieved by core plate 101 and cavity plate 102. Injection site 103 is used to inject injection material to form the first injection molding product.

Next, at step 303, when the molding of the first injection molding product is complete, and when the second insert plate is heated up to a desired temperature, the second insert plate is rotated down toward the cavity plate to be compressed. As described in FIG. 1 and FIG. 2 above, step 303 is achieved by rotational apparatus 200 including motor 118, rotating arm 113, slide track 116a, spring 117, block 115, and tunnel 116.

Finally, at step 304, as first insert plate is rotated up to be adjacent to the induction coil. Step 304 is similar to step 301 except that second insert plate 112 is substituted by first insert plate 111.

Next, referring to FIG. 4(a) to FIG. 4(e), different operation cycles of the injection molding apparatus and the implementation of method 300 in accordance with exemplary aspects of the present invention are illustrated.

In FIG. 4(a), first insert plate 111 and its first molding pattern 121 are in the compression cycle. During this cycle, second insert plate 112 is heated up by the induction currents induced by external induction coil 119. First injection molding product 411 is obtained. This is an exemplary implementation of step 301.

Next in FIG. 4(b), when the compression cycle of first insert plate 111 is completed, motor 118 pushes to separate core plate 101 from cavity plate 102, causing spring 117 to extend, slide track 116a is withdrawn from tunnel 116. At this moment, first insert plate 111 is cooled down by heat transfer. Next, second insert plate 112 is heated up. First injection molding product 411 is removed. This an exemplary implementation of step 302.

Next in FIG. 4(c), when the heating cycle of second insert plate 112 and its inject molding pattern 122 are completed, motor 118 rotates second insert plate 112 down toward cavity plate 102. This is an implementation of step 303.

In FIG. 4(d), the compression cycle of second insert plate 112 begins. Motor 118 retracts spring 117 causing core plate 101 to mate with cavity plate 102. Injection material listed above is injected into injection site 103 as second insert plate 112 is compressed. This results in the formation of second injection molding product 412. This is an exemplary implementation of step 304.

Finally, in FIG. 4(e), second insert plate 112 is cooled down by heat transfer to the surrounding environment, and second injection molding product 412 is ready. This is similar to the situation of FIG. 4(a). And the compression of second insert plate 112 and external heating (Ex-IH) of first insert plate 111 alternately rotated and repeated.

Experiments

Figure 4:
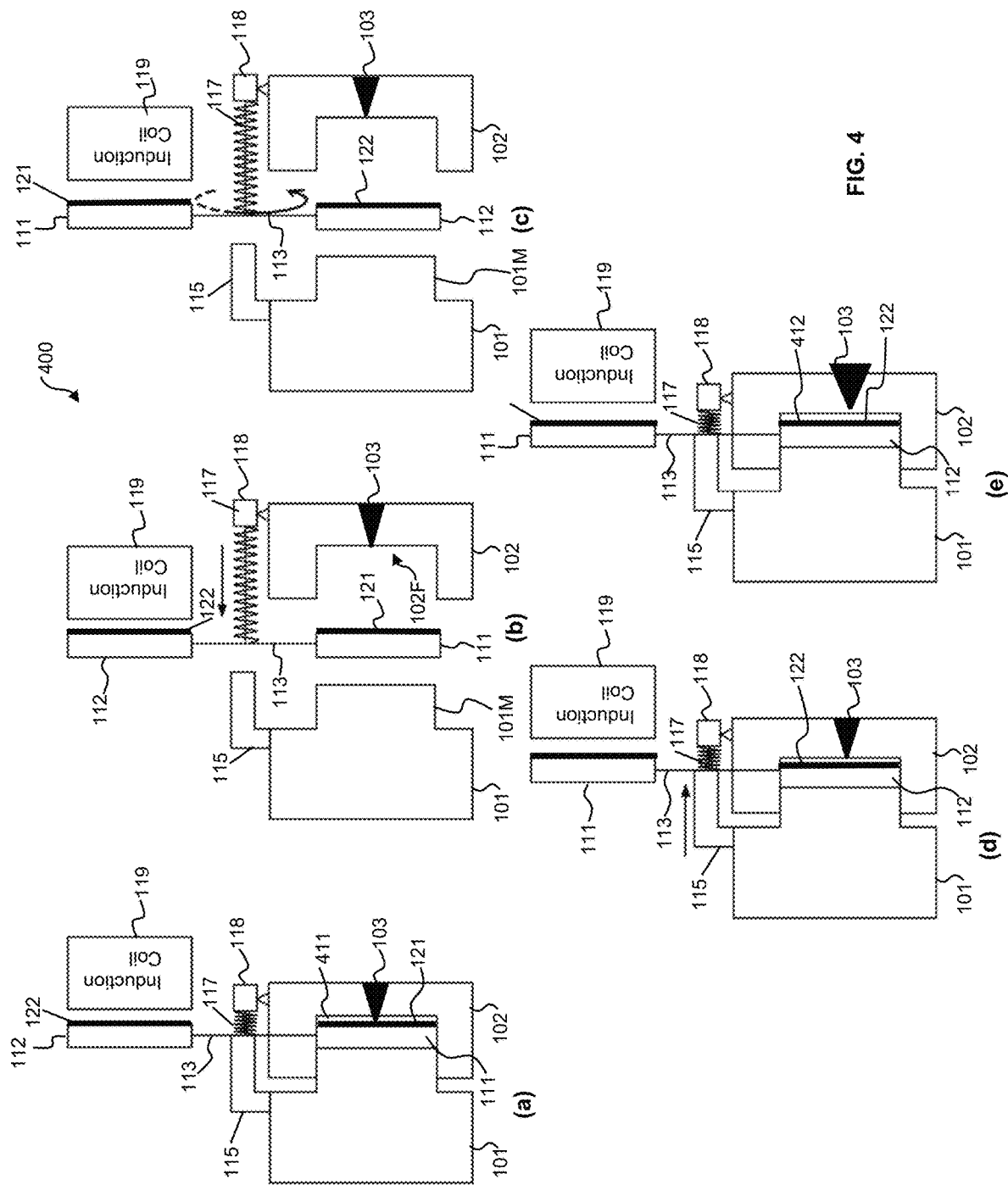
FIG. 4(a)-FIG. 4(e) show different operation cycles of the injection molding apparatus in accordance with an exemplary embodiment of the present invention.

The External Induction Heating (Ex-IH) with the assistance of rotational apparatus 200 as described above in FIG. 1 to FIG. 4(a) to FIG. 4(e) was performed by simulation and experiments. External induction heating with rotational apparatus 200 for mold temperature control (Ex-IH) is a novel technique that can directly and rapidly heat the surface of first and second insert plates 111 and 112 during the process of injection molding 300. The external induction heating (Ex-IH) device used in the invention consists of an induction heating unit and a rotational structure. The role of the induction heating system implemented by induction coil 119 is to provide a heat source, which heats the outer surfaces of first insert plate 111 and second insert plate 112 by induction currents. In this research, the Eagle Fly Induction heating source from X-Forming Company in Hochiminh City, Vietnam, was used; this heating source (induction coil 119) can support a maximum current of up to 750 A, and the highest frequency is 75 kHz. In addition, a mold temperature controller was used for the coolant device to provide the cooling fluid at a given temperature to cool the mold after the filling process and to heat the mold to the initial temperature at the start of the experiment. In this experiment, first insert plate 111 and second insert plate 112 were used for controlling the cavity temperature. These first and second insert plates 111 and 112 are changed every molding cycle by the rotation structure as shown FIG. 1, FIG. 2, and FIG. 4(a) to FIG. 4(e). This structure 100 includes first insert plate 111 and second insert plate 112, a rotating arm (R) 113, a slide track 116a (S), spring 117, and motor (M) 118. First insert plate 111 and second insert plate 112 are assembled on the two sides of rotating arm 113. For changing the position of these insert plates 111 and 112, rotating arm 113 rotates around the center line at pivot 114 of slide track 116a by receiving the rotation moment from motor (M) 118. At the initial position, when the mold opens as shown in FIG. 4(b), the position of first and second insert plates 111 and 112, and rotating arm 113 are depicted in FIG. 1a. When the mold closes as in FIG. 1b, core plate 101 moves toward cavity plate 102, and block unit 115 pulls rotating arm 116a toward cavity plate 102. Therefore, rotating arm 113 and first and second insert plates 111 and 112 move toward the cavity plate 102, causing male protrusion 101M to mate with female cavity 102F. This moving is finished when the mold totally closes, as in FIG. 1b. When the molding cycle of FIG. 1b finishes, core plate 101 and cavity plate 102 are half opened. At this step, core plate 101 moves to the left, and the mold plates returns to the position shown in FIG. 1a. In this step, spring (S) 117 presses rotating arm 113, and it slides to the farther side of cavity plate 102, and first insert plate 111 and second insert plate 112 are rotated to alternate their positions for the next cycle.

In order to apply the Ex-IH to the molding cycle, the following steps were used: first, induction coil 119 was used as a heating source for heating second insert 112 of the injection molding apparatus 100. The induction coil 119 produces high-frequency currents in the coils (see FIG. 2). This current generates a magnetic field of the same frequency as the high-frequency source, which varies around the coil 119. When a high-frequency current is transmitted through the coil, a high-frequency magnetic field with variable frequency is produced, and an eddy current appears on the surface of second insert 112. This current heats the insert's surface. This heating step is performed during the molding cycle as in FIG. 4a—Step 1. Second, when the heating step and the molding cycle are complete, core plate 101 and cavity plate 102 are separated as in FIG. 4b—Step 2. In this step, first injection molding product 411 is ejected in preparation for the new molding cycle. Simultaneously, the rotation apparatus 200 is operated, and the locations of first insert plate 111 and second insert plate 112 are alternated together. The new positions of these inserts are shown in FIG. 4(c)—Step 3. In this step, the high-temperature second insert plate 112 is located on the inside of the molding area in preparation for the new molding cycle, and the lower-temperature first insert plate 111 is located on the outside of the molding area in preparation for the new heating step. After this, first and second insert plates 111 and 112 move to the closing position as in FIG. 4(d)—Step 4. After this, the melt is pressed into the molding cavity to form second injection molding product 412. In this step, due to the melt flow's contact with the high-temperature area of second insert plate 112, the frozen layer is reduced; in this way, the filling ability can be improved.

Simulation of Method 300 and Injection Molding Apparatus 100.

Figure 5:
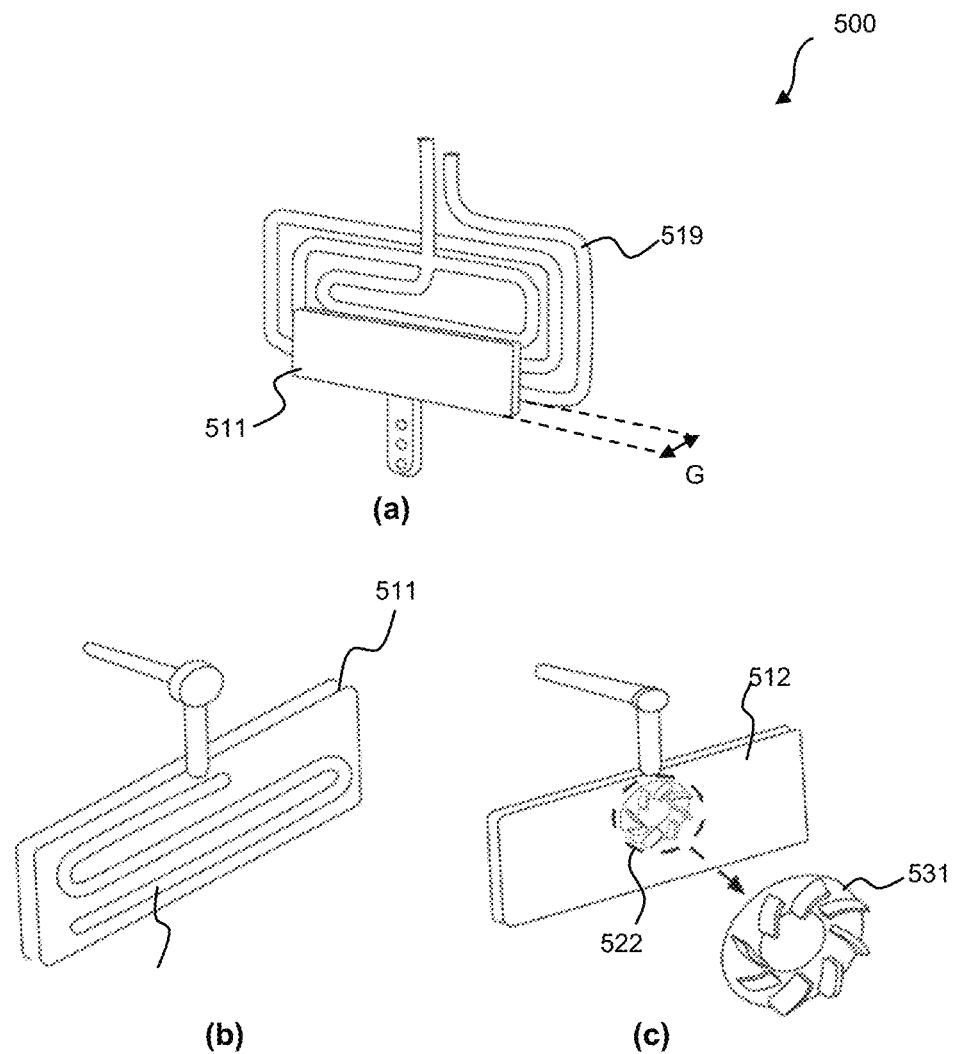
FIG. 5 shows meshing models for (a) the simulation process in induction heating, (b) a model for melt flow length, and (c) a micro product in accordance with an exemplary embodiment of the present invention.

In this experiment, to observe the melt flow length of acrylonitrile butadiene styrene (ABS) in thin-wall injection molding with the assistance of external induction heating as described above, a melt flow length model was built as in FIG. 5. In this model 500, the melt flows into the thin cavity 521 with a thickness of 0.5 mm and a width of 10 mm. The entire size of cavity 521's area is 25 mm×90 mm. Therefore, to create a high cavity temperature and reduce the amount of formed frozen layer, two inserts (a first insert plate 511 and a second insert plate 512) with the same size were designed and manufactured as in FIG. 5. These first and second inserts 511 and 512 designs had a width of 35 mm and a length of 95 mm. The thickness of first and second inserts 511 and 512 was selected to be 5 mm. According to other studies [34,35], the thinner first and second inserts 511 and 512 will support a higher heating speed; however, in such a heating strategy, first and second inserts 511 and 512 are rotated after the molding cycle is finished; therefore, a thinner insert reduces the rigidity of the rotation system. In addition, because the induction heating method only impacts the insert surface during the heating period, the thickness of the insert does not significantly impact the heating speed in this case. Therefore, a thick insert was selected for improving the stability of the rotation system. FIG. 1b also shows the position of first insert plate 111 (511 in FIG. 5), second insert plate 112 (512 in FIG. 5), and induction coil 119 during the heating period. In other studies [11,35], a gap G between induction coil 519 and the heating surface was found to be an important parameter affecting the heating speed and the temperature distribution of the heating surface. In this experiment, the heating position is located outside of the molding area of cavity plate 102, so the gap (distance) G between the coil and the heating surface can be easily established. In the heating strategy of the present invention, the heating position is separated from the mold plates; therefore, the magnetic control of the heating is much easier. In this experiment, to observe the influence of the gap G between the induction coil 519 and the heating surface as well as the temperature distribution, this gap G was varied from 5 to 15 mm in the simulation and experiment.

In the field of mold temperature control, one of the advantages of induction heating is the ability to predict the heating result [11,34,35]. However, the heating position in this research is novel; therefore, the heating process was achieved using the meshing model as in FIG. 5 and Table 1.

TABLE 1

| Material | Property | Value | Unit |
|---|---|---|---|
| Copper | Relative Permeability ($\mu/\mu_o$) | 1 | 1 |
| | Electrical conductivity | $5.87 \times 10^7$ | S/m |
| | Coefficient of thermal expansion | $17 \times 10^{-6}$ | 1/K |
| | Heat capacity at constant pressure | 387 | J/(kg · K) |
| | Density | 8940 | Kg/m$^3$ |
| | Thermal conductivity | 398 | W/(m · K) |
| | Young's modulus | $128 \times 10^9$ | Pa |
| | Poission's ratio | 0.34 | 1 |
| | Reference resistivity | $1.72 \times 10^{-8}$ | 'Q · m |
| | Resistivity temperature coefficient | $3.9 \times 10^{-3}$ | 1/K |
| | Reference temperature | 273.15 | K |
| Steel | Electrical conductivity | $1 \times 10^7$ | S/m |
| | Relative permeability ($\mu/\mu_o$) | 100 | 1 |

TABLE 1-continued

Material Properties

| Material | Property | Value | Unit |
|---|---|---|---|
| | Thermal conductivity | 68 | W/(m · K) |
| | Density | 7210 | Kg/m$^3$ |
| | Heat capacity at constant pressure | 448 | J/(kg · K) |

In this model, the coil material for induction coil 519 is copper, and insert plates 511 and 512 are steel material. The main parameters for heating simulation of copper and steel are shown in FIG. 5. Coil 519 has a diameter of 8.0 mm. The dimension of first insert plate 511 and second insert plate 512 are shown above. During simulation, the heat transfer mode around all external surfaces of both first insert plate 511 and second insert plate 512 were set at free convection to the air, with an ambient temperature of 30° C. and a heat transfer coefficient of 10 W/m$^2$ K. To improve the simulation result, first insert plate 511 was meshed by a triangular mesh, and the corner refinement method was applied for the corner positions. In addition, to reduce the simulation time, coil 519 was meshed using a 3D swept mesh, which could provide faster calculation. The meshing model and the boundary conditions were imported into COMSOL software (Pitotech Co. Ltd., Chang Hua City, Taiwan) for running the simulation.

In this experiment to verify injection molding apparatus 100 of the present invention, for observing the improving of the filling ability, the model of melt flow length testing was designed, and the meshing model was built as in FIG. 5b as a simulating step. In addition, the application of Ex-IH on the micro molding part was also simulated with the meshing model as in FIG. 5c. These simulation models include the runner system, molding part, and the insert plate. The runner system has the melt entrance with the parameter as in FIG. 5b,c. The hybrid mesh with 5 outer layers was applied for the runner meshes. The melt flow length cavity and the micro molding part were meshed by the boundary layer meshing (BLM) with the element size of 0.1 mm and 0.02 mm, respectively. In this research, to observe the influence of Ex-IH on the filling ability of hot melt, the model of insert plate was added into the simulation model. In the simulation process, the insert plate is set at the temperature with the heating time varied from 2 to 5 s. For running the simulation process, the Moldex3D software (CoreTech System Co., Ltd., Chupei City, Hsinchu County 302, Taiwan) was used with the function of filling.

Experiment Method

Figure 7:
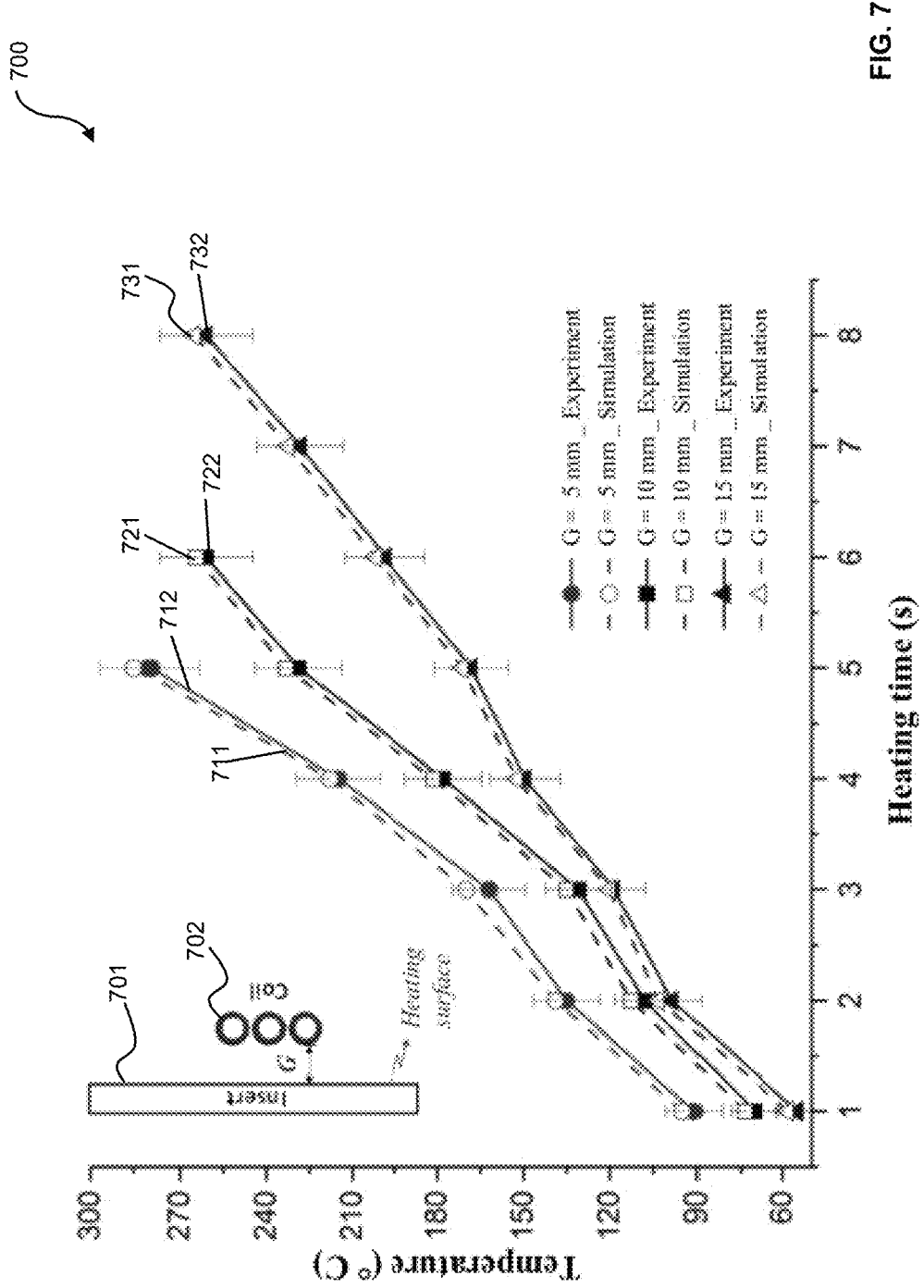
FIG. 7 shows a graph for comparison of temperature history at point O between experiment and simulation in accordance with an exemplary embodiment of the present invention.
Figure 8:
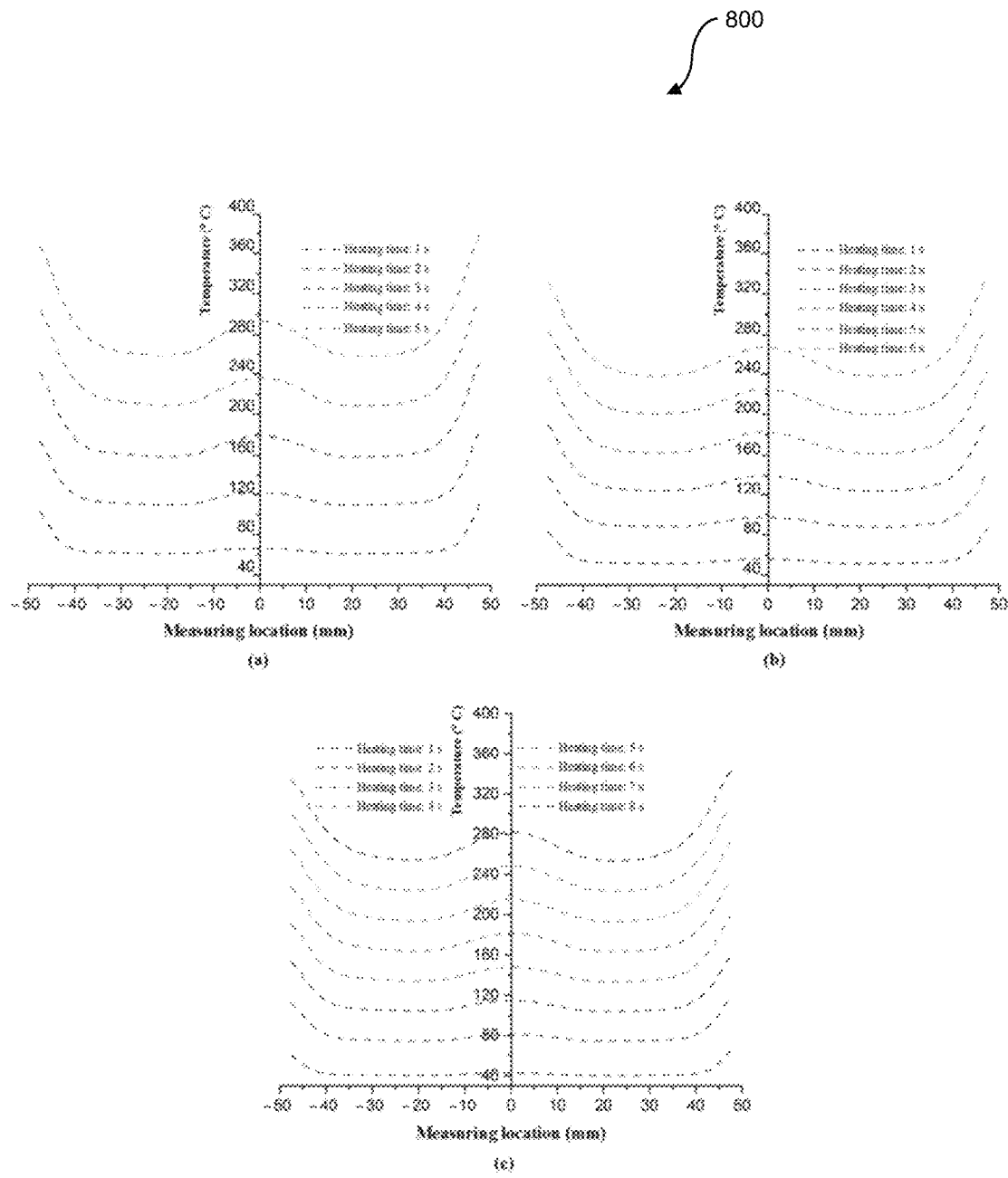
FIG. 8 shows graphs of simulation results of temperature distribution of line L with different gap dimensions in accordance with an exemplary embodiment of the present invention.
Figure 9:
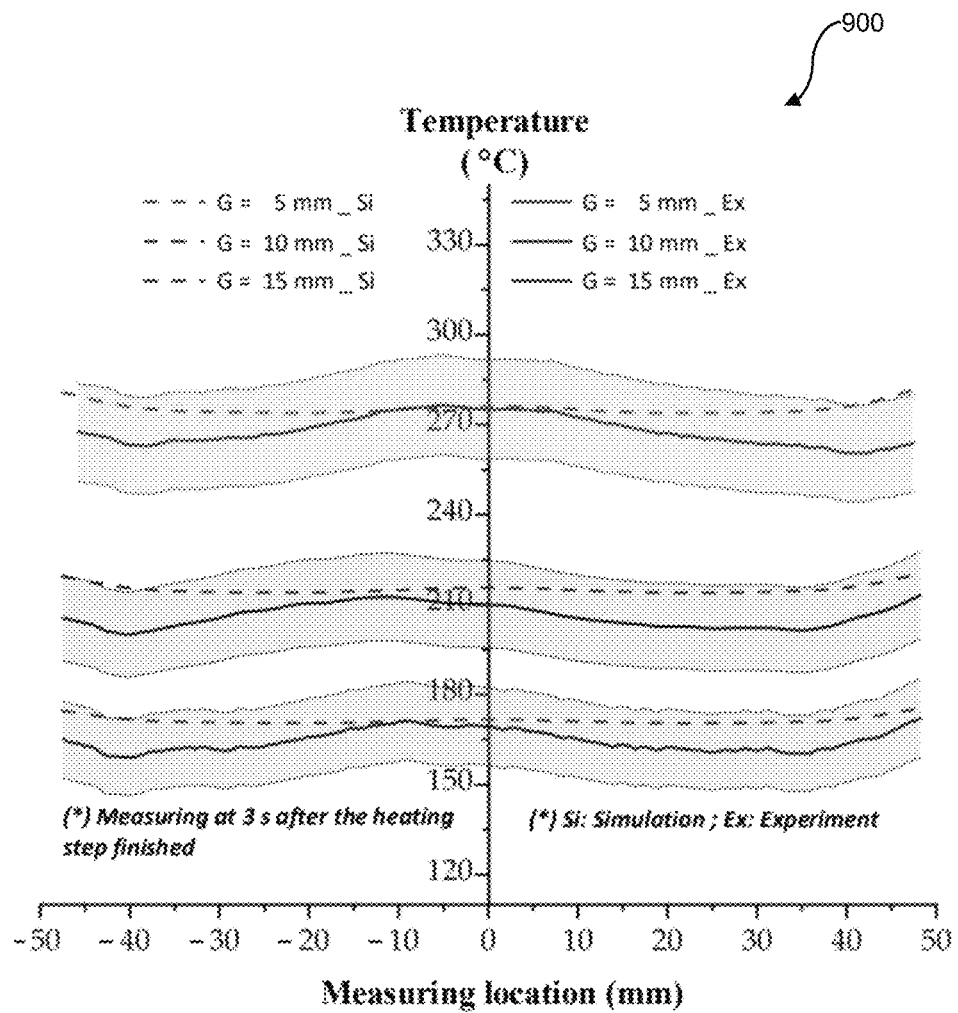
FIG. 9 is a graph comparing the temperature distribution of line L between simulation and experiment with the heating time of 5 seconds in accordance with an exemplary embodiment of the present invention.
Figure 10:
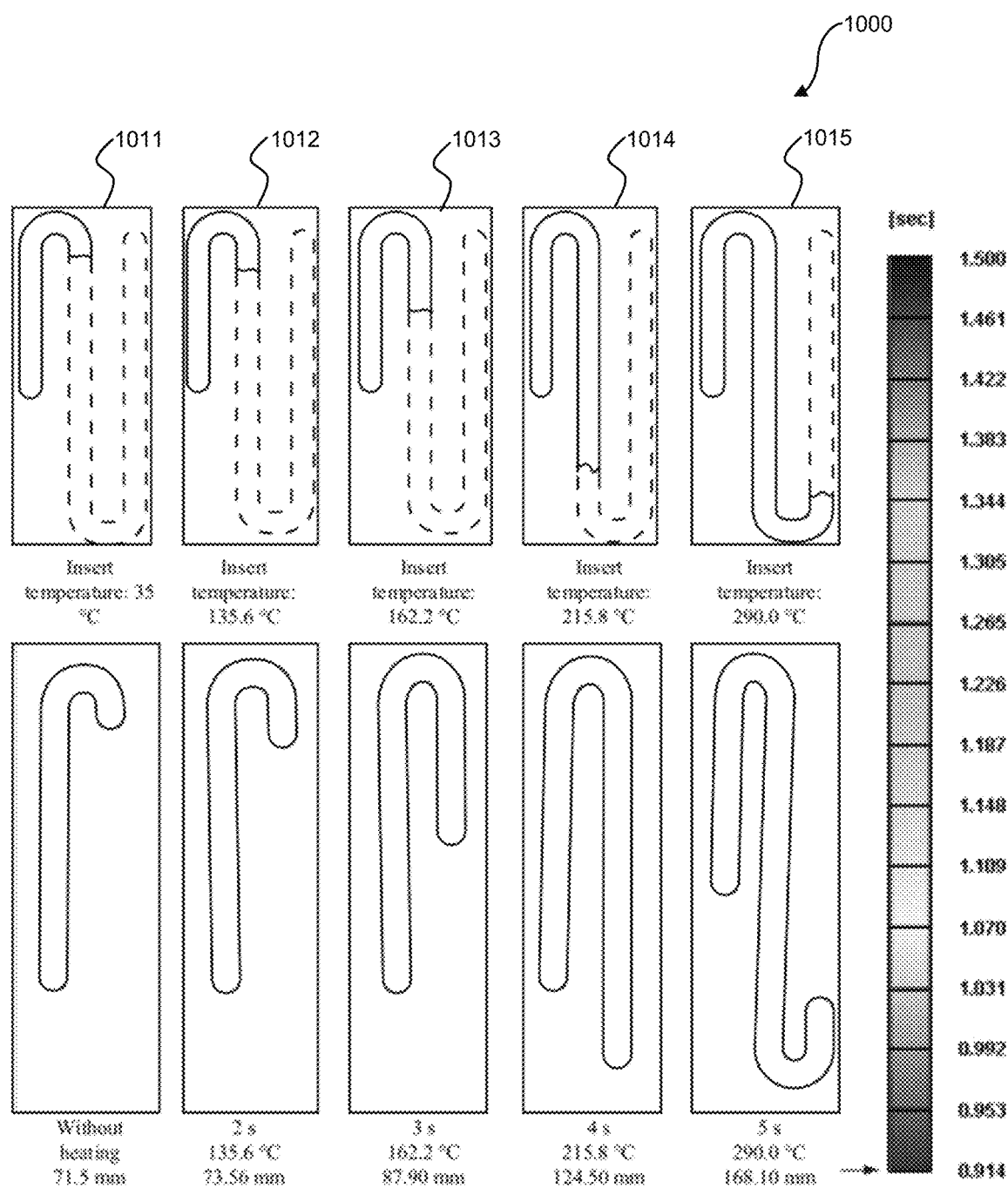
FIG. 10 shows the simulation and experiment of melt flow length model after molding with the Ex-IH heating method under different heating times.

To observe the influence of external induction heating on the injection molding process, the real molding process of a plastic product as an insert block was used for this experiment. With the common injection molding process, this type of product involves a kind of thin wall injection molding. With this product type, the issues with short shot are readily encountered if the injection pressure is low. However, when the injection pressure is too high, problems with flash can easily occur. Therefore, due to its ability to control mold temperature, external induction heating was applied for this molding process and expected for improvements in the product flow length when the injection molding process was operated with a moderate injection pressure. In injection molding field, ABS (acrylonitrile butadiene styrene) is a popular material that provides favorable mechanical properties such as impact resistance, toughness, and rigidity when compared with other common polymers. In the molding process, the molding temperature impacts the final properties of ABS product. For example, molding at a high temperature improves the gloss and heat resistance of the product, whereas the highest impact resistance and strength are obtained by molding at low temperature. ABS is one of many types of thermoplastics with biomedical applications, with injection-molded components being easy to manufacture for single use. In addition, ABS is also a popular material for micro parts in the electrical industry. In general, ABS has a wide application in industry; however, one of the highest challengers for producing is the shaping ability of ABS, especially with the thin-wall product. Therefore, in this study, the plastic material of ABS (acrylonitrile butadiene styrene) is used for the molding process, and the molding parameters are maintained for all testing cases. In the experiment, the molding machine of SW-120B (Shine Well Machinery Co., Ltd., Tai-Chung City, Taiwan) is used. The ExIH system, the mold, and mold temperature control were connected as in FIG. 6. For estimating the influence of Ex-IH on the filling ability of the thin-wall injection molding product, the plastic product shown in FIG. 7 was used for testing. This product has a base thickness of 0.8 mm and a wing thickness of 0.4 mm. The insert for the thin-wall product was selected as the subject of the melt flow length model, which is introduced in FIG. 4. The mold plates used for the experiment are shown in FIG. 8. The molding process was achieved with the parameters presented in Table 2. After the molding was finished, the product was collected and measured by ATOS Compact Scan 2M (GOM GmbH company, Schmitzstrape, Braunschweig, Germany). The results of the flow length and filling percentage are compared and discussed In this study, for observing the temperature distribution of the insert plate under different heating parameters after the heating process was finished, a Fluke TiS20 infrared camera (Fluke Corporation, Everett, Washington, DC, USA) was used for capturing the temperature distribution at the heating surface. The temperature distribution was observed at the time that the insert was moved to the position shown in FIG. 8(c), immediately prior to filling. Therefore, there was a delay between the end of heating and the point of observation. This delay is around 3 s. Thus, in this study, the collected temperature distribution does not reflect the result at the end of the heating time. This temperature distribution is close to the temperature distribution at which the hot melt is contacted Results and Discussion Effect of the Gap between the Heating Surface and the Induction Coil In this research, due to fact that the heating position is located on the outside of the mold structure, the heating step was not significantly impacted by other parts. In addition, this heating strategy could provide a free volume for setting up other devices for controlling the magnetic flux [39], which will help to improve the heating efficiency. For the heating step in this investigation, the heating process was carried out by the coil and the insert, with their positions shown in FIG. 5(a) and FIG. 6. In traditional induction heating for injection molding, the gap between the coil and the heating surface is an important parameter. A small gap could support a higher heating speed, reducing the heating time. However, with a small gap, the coil and the heating surface could come into contact, and the cavity surface may thus be damaged. In addition, because the plastic melt temperature is lower than 300° C., the temperature limit of the insert should be researched for the case when the temperature range is lower than 300° C. For observing the influence of the gap between the heating surface and the induction coil, the heating process was simulated, and the gap between the heating surface and induction coil was varied from 5 to 15 mm. After this, the data for temperature distribution of the insert surface and the temperature at point O (as in FIG. 9) were collected and compared. The variation in the mold temperature with distance is described in FIG. 9 and FIG. 10. In the simulation, for an initial mold temperature of 30° C. and a gap (G) of 5 mm, it can be seen that the magnetic heating process can heat the plate to 290° C. in 5 s. However, at the distance of 15 mm, it took up to 8 s to reach 270° C. In general, the shorter the distance, the stronger its influence on the heated plate. Thus, with a shorter distance, a higher heating rate is achieved at the measuring point. This result could be observed clearly during the simulation and experiment, with the temperature distribution shown in FIG. 9. For real application in the molding cycle, the result of heating time shows that this heating strategy has almost no impact on the cycle time, which is often varied from around 10 to 20 s. Therefore, depending on the cycle time, the gap (G) could be set to the greatest value needed to ensure that the heating rate is not too high and maintain the safety of the coil and the insert surface. This result also shows that this heating method is appropriate for the insert, which can easily reach temperatures over 200° C. FIG. 10 also shows that the simulation and experimental results are nearly equal, indicating that the actual results are reliable.

Effect of the Heating Time on the Temperature Distribution

Figure 11:
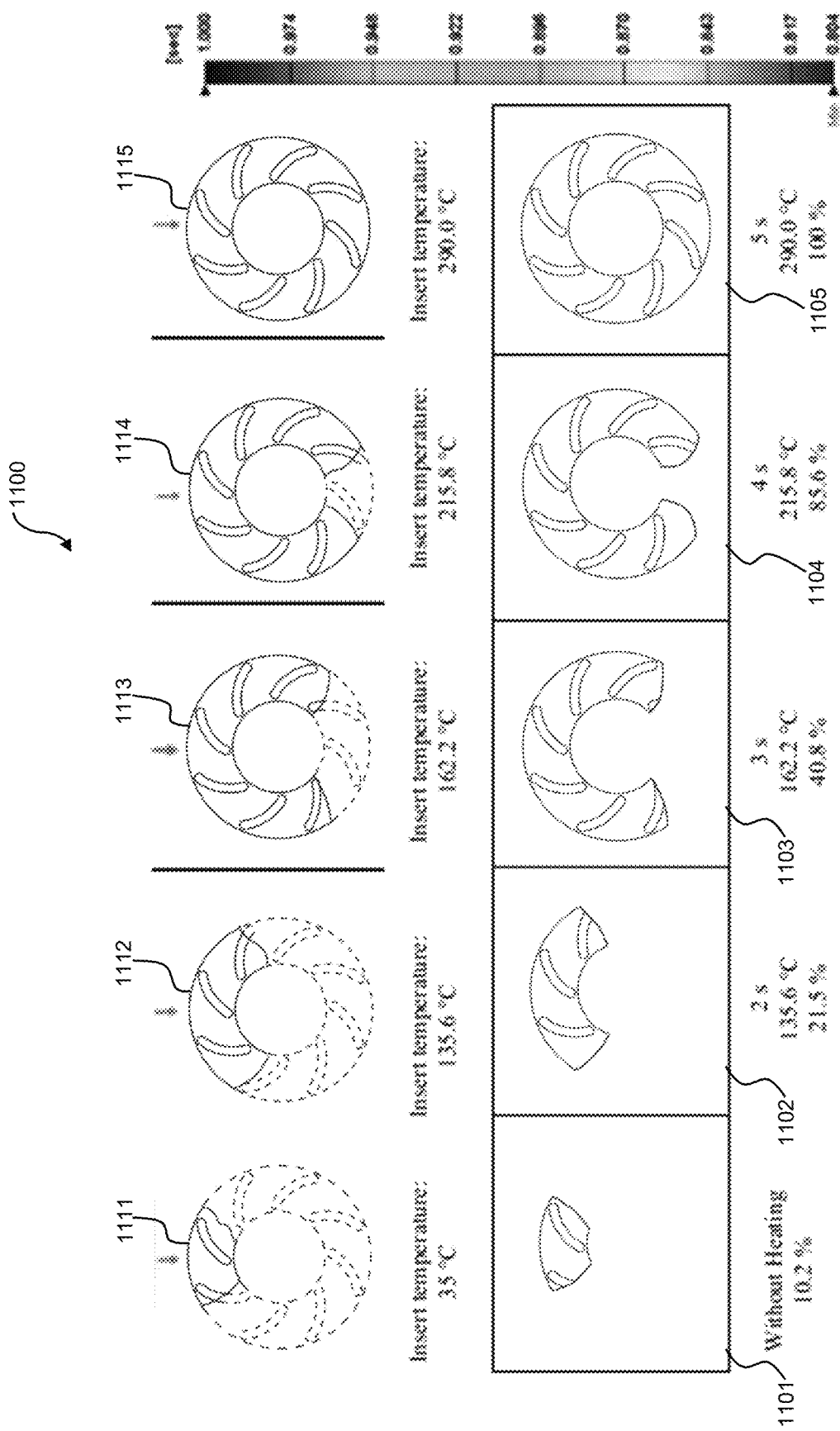
FIG. 11 shows the simulation and experiment of thin-wall parts after molding with Ex-IH under different heating times.

As mentioned in FIG. 2, in this study, because the heating process takes place during the molding cycle, the heating time simply needs to be shorter than the molding cycle; therefore, the total time needed for one cycle should not be longer than in cases of traditional molding. In addition, a slower heating rate could allow for a longer working lifetime of the insert due the reduction in residual stress when the insert temperature increases. Thus, in this study, the heating time was observed with values varying from 1 to 8 s, with the heating gap varied from 5 to 15 mm. The temperature data for line L (as in FIG. 4) were collected by simulation and experiment. The variation in the mold temperature of line L versus heating time is described in FIG. 11. This result shows that the temperature of line L increased clearly with the longer heating time. In addition, the different temperatures of line L clearly show the influence of edge effect. Due to the edge effect, the temperature on two sides of the insert rapidly increased. In addition, this effect also allowed the temperature of the holding area to rapidly increase; this result could be observed clearly in FIG. 8(c). Therefore, this is the reason for the higher temperature in the central area of line L. FIG. 11 also shows that overheating could occur at the side of the insert. This is also a disadvantage of the induction heating method in the injection molding field. The result shown in FIG. 11 also demonstrates that a lower heating rate could mitigate the edge effect. FIG. 11 shows that the heating time of 5 s supports the temperature at the central point of over 280° C. when the temperature at the two edges is over 360° C. However, with a slower heating rate, FIG. 11(c) shows that the central temperature could reach 280° C., but the side temperature is lower than 360° C., which is around 360° C. Thus, this result demonstrates that the edge effect of induction heating could be reduced by using a lower heating rate or with a longer heating time. This is another advantage of Ex-IH, which could support a longer heating period than that of the traditional induction heating process.

Figure 12:
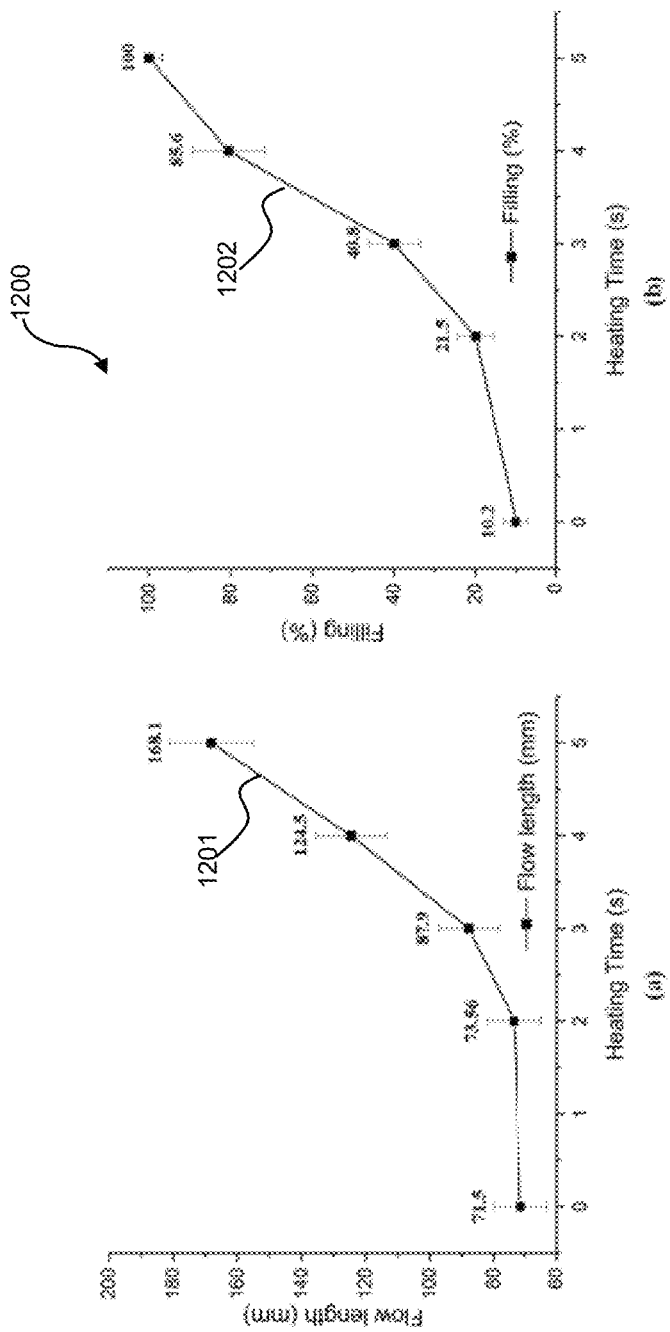
FIG. 12 are graphs showing improvement of (a) melt flow length and (b) filling percentage of the micro molding product when the Ex-IH heating method of the present invention was used.

For verifying the simulation result, the experiment was performed with the same boundary conditions as the simulation. The temperature information of line L was collected by an infrared camera. In experiment, when the heating process finished, the insert plate needed about 3 s for rotating to the molding position; therefore, the temperature at this time was collected. In addition, in simulation, the temperature distribution was also collected at 3 s after the end of heating step. The comparison between the simulation and experiment is shown in FIG. 12. Compared with FIG. 11, this result shows that the temperature profile of line L undergoes a change after 3 s, when heating is complete. The temperature was more uniform, and the high temperature at the two sides was clearly reduced due to the heat transfer from the higher temperature to the lower temperature. With the heating time of 5 s, the experimental result shows that the temperature of line L varied around 280.0, 210.0, and 168.0° C. with a gap of 5, 10, and 15 mm, respectively. This result also demonstrates that the Ex-IH could support the heating process for the cavity area of 35 mm×95 mm and has strong potential for application in the field of mold temperature control.

Figure 6:
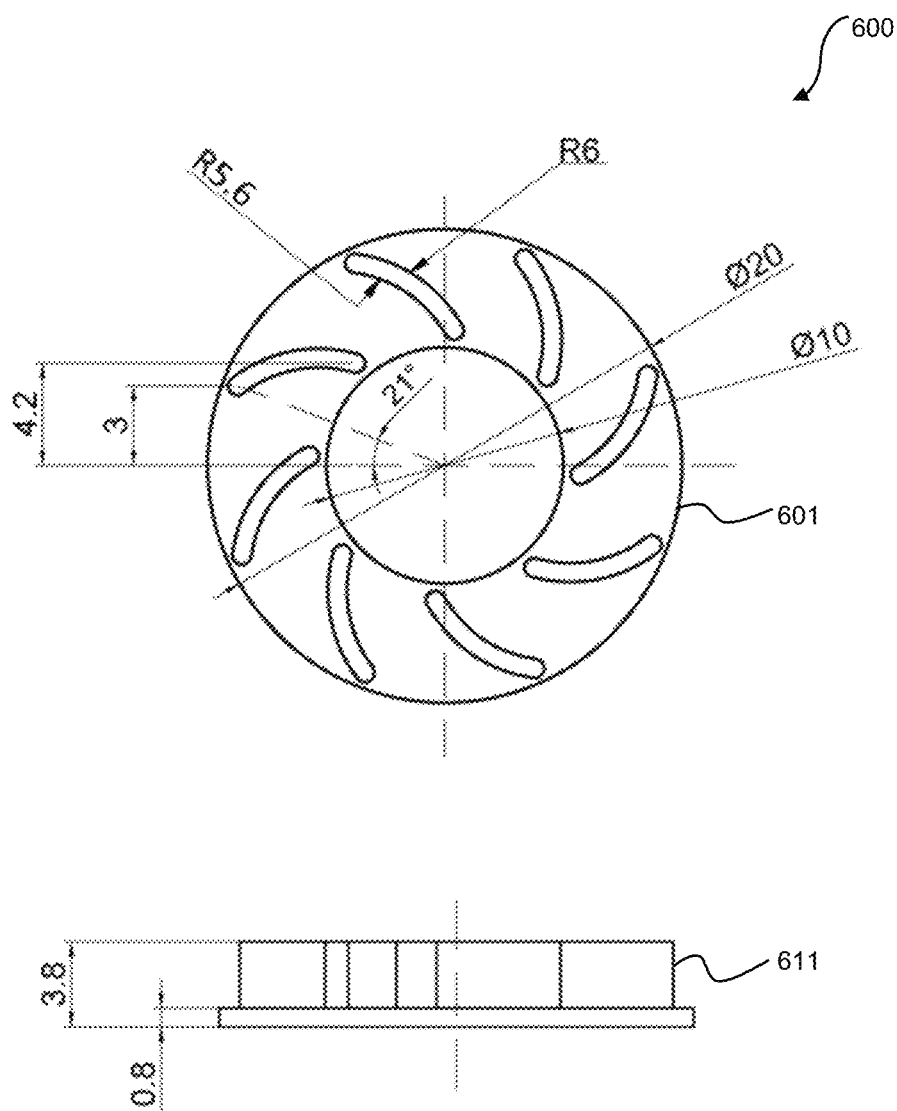
FIG. 6 shows the dimension of the microproduct part in accordance with an exemplary embodiment of the present invention.

For observing the influence of Ex-IH on improving the melt flow length, the testing model and real thin-wall product were designed as in FIG. 5b and FIG. 6. For the experiment, the injection mold was designed as in FIG. 1a-FIG. 1b. The substance to be melted was ABS. For both models, the heating time was varied from 2 to 5 seconds with a gap (G) of 5 mm. Nonetheless, for complete filling of the cavity, the mold temperature must be set to the highest possible value for the device with the thin-wall product, as in this case. Due to the reduction in the freeze layer of the melt flow, the hot melt flows easier. However, when the mold temperature is at a high value, energy wastage occurs along with other issues such as warpage and flashing. In the invention, control of the mold local temperature was specifically discussed to minimize these problems. Instead of keeping the entire mold plate at a high temperature, the local mold temperature was controlled at the beginning of the mold process by Ex-IH. The high temperature at the core side reduces the melt flow pressure drop as it flows over the area. FIG. 1(a) and FIG. 1(b) show the plate of the cavity, which includes the region of the cavity and the gates.

For observing the effect of high-frequency magnetic forces on the heating method, an infrared camera was used to capture the temperature distribution at the end of the heating step to verify the heating efficiency as well as the capacity of the local heating. The result of the product heating test at different distances at 5 seconds is shown in FIG. 7. This result shows that the temperature distribution is focused at the insert area; this distribution is almost the same as the simulation result, which is shown in FIG. 7.

For observing the improving of melt flow length with the assisted if Ex-IH, the simulation was conducted with the meshing model as in FIG. 5(b), FIG. 5(c). In the experiment, the molding samples were collected for observing the improvement of melt flow length under different heating times. The molding samples and the simulation results are shown in FIG. 10 and FIG. 11. The melt flow length and the filling percentage of thin-wall product were measured and compared as in FIG. 12. According to simulation and experiment results, when the mold heating time increases from 0 to 5 s, the flow length increases significantly from 71.5 to 168.1 mm (FIG. 10). This means that the Ex-IH improved the melt flow length by around 2.3 times. FIG. 10 and FIG. 12(a) show that the melt flow length was increased clearly in the case of 3, 4, and 5 s heating time. This means that with the ABS material, the melt flow length improves when the insert temperature is higher than 162.5° C. For applying the Ex-IH for real product, the microproduct with the dimension as FIG. 6 was applied. The molding was achieved with the mold plate as in FIG. 1(a) and FIG. 1(b). The molding was operated in the case of without heating step; then, the Ex-IH was applied with the heating time varied from 2 to 5 s. The molding products were collected and compared with simulation results as in FIG. 11. This result also shows that the Ex-IH has a strong influence on the filling ability of microinjection molding part, which was improved from 21.5% to 100% under the heating time increases from 2 to 5 s. This result is a significant improvement in injection molding when we compared with the traditional process with the case of without heating step. According to the experiment result, if we increase any temperature (insert sheet temperature or plastic temperature), the flow length and the filling percentage of the product have a strong influence. In general, both models of melt flow length and micro molding product show that the Ex-IH could improve the melt flow length, and the results of simulation and experiment have a good agreement.

In this experiment to verify the present invention, external induction heating with a rotational structure for mold temperature control (Ex-IH) was applied during the injection molding cycle for improving the filling ability. The simulation and experiment were performed focusing on the melt flow length mold and thin-rib molding. For the molding of the melt flow volume, the heating time was varied from 1 to 5 s, and the heating process was then conducted with a gap (G) of 5, 10, and 15 mm. With the thin-wall product, the mold temperature control with the Ex-IH was achieved with a gap of 5 mm, and the heating time increased from 2 to 5 s. According to the simulation and experimental results, the following conclusions were obtained:

For an initial mold temperature of 30° C. and a gap (G) of 5 mm, it can be seen that the magnetic heating process can heat the plate to 290° C. in 5 s. However, at a distance of 15 mm, it took up to 8 s to reach 270° C. The heating time results show that this heating strategy has almost no impact on the cycle time, which often varied from around 10 to 20 s. Therefore, depending on the cycle time, the gap (G) could be set to the greatest possible value to ensure that the heating rate is not too high and to prolong the lifetime of the coil and the insert surface.

The temperature of line L clearly increased with a longer heating time. Due to the edge effect, the temperature on two sides of the insert quickly increased. In addition, this effect also allowed the temperature at the holding area to increase quickly. Varying the heating time from 1 to 8 s, the result shows that a lower heating rate could reduce overheating at the edge of the insert plate.

The temperature profile of line L undergoes a change after the heating for 3 s is completed. The temperature was more uniform, and the high temperature at the two sides was clearly reduced due to the heat transfer from the higher temperature to the lower temperature. With the heating time of 5 s, the experimental results show that the temperature of line L varies around 168.0° C., 210° C., and 280° C. with a gap of 5, 10, and 15 mm, respectively. This result also demonstrates that Ex-IH could support the heating process for a cavity area of 35 mm×95 mm and has great potential for application in the field of mold temperature control. According to the measurement results, when the mold heating time was increased from 0 to 5 s during the molding process, the flow length significantly increased from 71.5 to 168.1 mm, and the filling percentage of the thin-wall product also increased from 10.2% to 100%. In general, when the Ex-IH was applied during the molding cycle, the total cycle time was similar to that in the traditional case.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 Injection molding apparatus
101 core plate
102 cavity plate
103 injection site
111 first insert plate
112 second insert plate
113 rotating arm
114 pivot connector
115 stop block
116 tunnel
116a sliding track
117 spring
118 motor
119 induction coil
120 side view of the injection molding apparatus
121 first molding pattern
122 second molding pattern
200 rotational apparatus
411 first injection molding product
412 second injection molding product
511 first insert plate
512 second insert plate
519 simulated induction coil
521 S flow pattern
522 second injection molding pattern
531 an injection molding product.

REFERENCES

1. Chung, C.-Y. Integrated Optimum Layout of Conformal Cooling Channels and Optimal Injection Molding Process Parameters for Optical Lenses. Appl. Sci. 2019, 9, 4341.
2. Loaldi, D.; Quagliotti, D.; Calaon, M.; Parenti, P.; Annoni, M.; Tosello, G. Manufacturing Signatures of Injection Molding and Injection Compression Molding for Micro-Structured Polymer Fresnel Lens Production. Micromachines 2018, 9, 653.
3. Feng, Y.; Lou, Y.; Shen, J. Microstructure-Forming Mechanism of Optical Sheet Based on Polymer State Transition in Injection Rolling Process. Polymers 2021, 13, 181.
4. Li, K.; Huang, X.; Chen, Q.; Xu, G.; Xie, Z.; Wan, Y.; Gong, F. Flexible Fabrication of Optical Glass Micro-Lens Array by Using Contactless Hot Embossing Process. J. Manuf. Process. 2020, 57, 469-476.
5. Sha, B.; Dimov, S.; Griffiths, C.; Packianather, M. Investigation of Micro-Injection Moulding: Factors Affecting the Replication Quality. J. Mater. Process. Technol. 2007, 183, 284-296.
6. Major, R.; Gawlikowski, M.; Sanak, M.; Lackner, J. M.; Kapis, A. Design, Manufacturing Technology and In- 7. Liu, H.; Zhang, X.; Quan, L.; Zhang, H. Research on Energy Consumption of Injection Molding Machine Driven by Five Different Types of Electro-Hydraulic Power Units. J. Clean. Prod. 2020, 242, 118355.
8. Lou, Y.; Xiong, J. Micro-Ultrasonic Viscosity Model Based on Ultrasonic-Assisted Vibration Micro-Injection for High-Flow Length Ratio Parts. Polymers 2020, 12, 522.
9. Ye, S.; Mo, W.; Lv, Y.; Wang, Z.; Kwok, C. T.; Yu, P. The Technological Design of Geometrically Complex Ti-6Al-4V Parts by Metal Injection Molding. Appl. Sci. 2019, 9, 1339.
10. Pomázi, Á.; Szolnoki, B.; Toldy, A. Flame Retardancy of Low-Viscosity Epoxy Resins and Their Carbon Fibre Reinforced Composites via a Combined Solid and Gas Phase Mechanism. Polymers 2018, 10, 1081.
11. Muszy'nski, P.; Poszwa, P.; Gessner, A.; Mrozek, K. Application of Selective Induction Heating for Improvement of Mechanical Properties of Elastic Hinges. Materials 2021, 14, 2543.
12. Monti, M.; Zaccone, M.; Frache, A.; Torre, L.; Armentano, I. Dielectric Spectroscopy of PP/MWCNT Nanocomposites: Relationship with Crystalline Structure and Injection Molding Condition. Nanomaterials 2021, 11, 550.
13. Murata, Y.; Kanno, R. Effects of Heating and Cooling of Injection Mold Cavity Surface and Melt Flow Control on Properties of Carbon Fiber Reinforced Semi-Aromatic Polyamide Molded Products. Polymers 2021, 13, 587.
14. Lin, C.-C.; Chen, K.-C.; Yeh, H.-C. Influence of Heat Sink on the Mold Temperature of Gypsum Mold Used in Injection Molding. Polymers 2020, 12, 701.
15. Oliveira, E.; Silva, J. P.; Laranjeira, J.; Macedo, F.; Lanceros-Mendez, S.; Vaz, F.; Ferreira, A. Fabrication, Characterization and Implementation of Thermo Resistive TiCu(N,O) Thin Films in a Polymer Injection Mold. Materials 2020, 13, 1423.
16. Guo, W.; Yang, Q.; Mao, H.; Meng, Z.; Hua, L.; He, B. A Combined In-Mold Decoration and Microcellular Injection Molding Method for Preparing Foamed Products with Improved Surface Appearance. Polymers 2019, 11, 778.
17. Liparoti, S.; Speranza, V.; Titomanlio, G.; Pantani, R. Effect of Rapid Mold Heating on the Structure and Performance of Injection-Molded Polypropylene. Polymers 2020, 12, 341.
18. Torres-Alba, A.; Mercado-Colmenero, J. M.; Diaz-Perete, D.; Martin-Donate, C. A New Conformal Cooling Design Procedure for Injection Molding Based on Temperature Clusters and Multidimensional Discrete Models. Polymers 2020, 12, 154.
19. Nian, S.-C.; Wu, C.-Y.; Huang, M.-S. Warpage Control of Thin-Walled Injection Molding Using Local Mold Temperatures. Int. Commun. Heat Mass Transf. 2015, 61, 102-110.
20. Meister, S.; Drummer, D. Affecting the Ageing Behaviour of Injection-Moulded Microparts Using Variothermal Mould Tempering. Adv. Mech. Eng. 2013, 5, 407964.
21. Li, K.; Yan, S.-L.; Pan, W.-F.; Zhao, G. Optimization of Fiber-Orientation Distribution in Fiber-Reinforced Composite Injection Molding by Taguchi, Back Propagation Neural Network, and Genetic Algorithm-Particle Swarm Optimization. Adv. Mech. Eng. 2017, 9, 168781401771922.
22. Maghsoudi, K.; Jafari, R.; Momen, G.; Farzaneh, M. Micro-Nanostructured Polymer Surfaces Using Injection Molding: A Review. Mater. Today Commun. 2017, 13, 126-143.
23. Vázquez, M.; Paull, B. Review on Recent and Advanced Applications of Monoliths and Related Porous Polymer Gels in Micro-Fluidic Devices. Anal. Chim. Acta 2010, 668, 100-113.
24. Venkatesh, G. Y.; Ravi Kumar, Y.; Raghavendra, G. Comparison of Straight Line to Conformal Cooling Channel in Injection Molding. Mater. Today Proc. 2017, 4, 1167-1173.
25. Lucchetta, G.; Fiorotto, M.; Bariani, P. F. Influence of Rapid Mold Temperature Variation on Surface Topography Replication and Appearance of Injection-Molded Parts. CIRP Ann. 2012, 61, 539-542.
26. Sánchez, R.; Martinez, A.; Mercado, D.; Carbonel, A.; Aisa, J. Rapid Heating Injection Moulding: An Experimental Surface Temperature Study. Polym. Test. 2021, 93, 106928.
27. Liparoti, S.; Speranza, V.; Pantani, R. Replication of Micro- and Nanofeatures in Injection Molding of Two PLA Grades with Rapid Surface-Temperature Modulation. Materials 2018, 11, 1442.
28. Wang, G.; Zhao, G.; Li, H.; Guan, Y. Multi-Objective Optimization Design of the Heating/Cooling Channels of the Steam-Heating Rapid Thermal Response Mold Using Particle Swarm Optimization. Int. J. Therm. Sci. 2011, 50, 790-802.
29. Wang, G.; Zhao, G.; Li, H.; Guan, Y. Research of Thermal Response Simulation and Mold Structure Optimization for Rapid Heat Cycle Molding Processes, Respectively, with Steam Heating and Electric Heating. Mater. Des. 2010, 31, 382-395.
30. Chen, S.-C.; Lin, C.-Y.; Chang, J.-A.; Minh, P. S. Gas-Assisted Heating Technology for High Aspect Ratio Microstructure Injection Molding. Adv. Mech. Eng. 2013, 5, 282906.
31. Minh, P. S.; Do, T. T.; Uyen, T. M. T. The Feasibility of External Gas-Assisted Mold-Temperature Control for Thin-Wall Injection Molding. Adv. Mech. Eng. 2018, 10, 168781401801610.
32. Yao, D.; Kimerling, T. E.; Kim, B. High-Frequency Proximity Heating for Injection Molding Applications. Polym. Eng. Sci. 2006, 46, 938-945.
33. Do, T. T.; Uyen, T. M. T.; Minh, P. S. The Feasibility of an Internal Gas-Assisted Heating Method for Improving the Melt Filling Ability of Polyamide 6 Thermoplastic Composites in a Thin Wall Injection Molding Process. Polymers 2021, 13, 1004.
34. Chen, S.-C.; Minh, P. S.; Chang, J.-A.; Huang, S.-W.; Huang, C.-H. Mold Temperature Control Using High-Frequency Proximity Effect Induced Heating. Int. Commun. Heat Mass Transf. 2012, 39, 216-223.
35. Sung, Y.-T.; Hwang, S.-J.; Lee, H.-H.; Huang, D.-Y. Study on Induction Heating Coil for Uniform Mold Cavity Surface Heating. Adv. Mech. Eng. 2014, 6, 349078.
36. Huang, P.-W.; Peng, H.-S.; Choong, W.-H. Mold-Face Heating Mechanism, Overflow-Well Design, and Their Effect on Surface Weldline and Tensile Strength of Long-Glass-Fiber-Reinforced Polypropylene Injection Molding. Polymers 2020, 12, 2474.
37. Kim, Y. H.; Lim, K. R.; Kim, W. T.; Kim, D. H.; Choi, Y. S.; Na, Y. S. Rapid Heating Blow Molding of Metallic Glasses by Infrared Heating. Results Mater. 2019, 3, 100045.

38. Erchiqui, F. Application of Genetic and Simulated Annealing Algorithms for Optimization of Infrared Heating Stage in Thermoforming Process. Appl. Therm. Eng. 2018, 128, 1263-1272.
39. Mrozek, K.; Muszy 'nski, P.; Poszwa, P. Application of Magnetic Concentrator for Improvement in Rapid Temperature Cycling Technology. Polymers 2021, 13, 91.

What is claimed is:

1. An injection molding apparatus, comprising:
a core plate containing a male protrusion;
a cavity plate containing a female cavity; wherein said core plate and said cavity plate are configured to move in a first direction belonging to a first plane so as said female cavity is aligned and mated with said male protrusion;
a first insert plate;
a second insert plate connected to said first insert plate by a rotating arm;
a motor; connected to said rotating arm, operable to rotate said first insert plate and second insert plate in and out of a mold forming space formed between said female cavity and said male protrusion in a second direction belonging to a second plane perpendicular to said first plane; and
an induction heating device, positioned outside of said female cavity, operable to cause an induction current that heats up a surface of either said first insert plate or said second insert plate when either one of them is rotated outside of said mold forming space, wherein when either said first insert plate or said second insert plate is heated up, it is rotated into said mold forming space to form an injection mold product by the mating of said female cavity and said male protrusion.

2. The injection molding of claim 1 further comprising:
a sliding track, connected to said motor and said rotating arm; and
a spring, enveloping said sliding track and connected between said rotating arm and said motor.

3. The injection molding of claim 2 further comprising:
a stop block, affixed on top of said core plate, having a tunnel aligned with said sliding track so that when said motor causes said spring to compress along said sliding track, said sliding track is inserted into said tunnel and pulling said core plate toward said cavity plate, whereby either said first insert plate or said second insert plate is sandwiched and compressed by said male protrusion.

4. The injection molding apparatus of claim 3 wherein said first insert plate and said second insert plate are made of steel.

5. The injection molding apparatus of claim 4 wherein said induction coil is made of copper (Cu).

6. The injection molding apparatus of claim 1 wherein said induction coil is positioned at a variable distance from said either first insert plate or said second insert plate.

7. The injection molding apparatus of claim 6 wherein said induction coil is operable to induce Eddy's currents with varying strengths.

8. The injection molding apparatus of claim 7 wherein said Eddy's currents are varied by changing the frequency of currents applied to said induction coil.

9. The method of producing injection molding products, comprising:

(a) heating a first insert plate to a first predetermined temperature using an induction coil positioned outside of an injection molding device comprising a core side containing a male protrusion and a cavity side containing a female cavity designed to align and mate with said male protrusion;
(b) pressing said first insert plate in between said female cavity and said male protrusion in a first direction belonging to a first plane to produce a first injection molding product;
(c) separating said injection molding device to remove said first injection molding product using an electric motor;
(d) rotating said first insert plate out of said female cavity and said male protrusion in a second direction belonging to a second plane perpendicular to said first plane; and
(e) rotating said second insert plate in between a space formed between said female cavity and said male protrusion and repeating said steps (a) to (d) to produce a second injection molding product.

10. The method of claim 9 further comprising:
(f) varying a current applied to said induction coil; and
(g) varying a distance between said induction coil and said either said first insert plate and said second insert plate.

11. The method of claim 10 further comprising:
varying the frequency of said current applied to said induction coil.

12. The method of claim 9 further comprising:
(h) heating said second insert plate to a second predetermined temperature using said induction coil prior to rotating said second insert plate in said second direction into said male protrusion and said female cavity.

13. The method of claim 9 further comprising:
injecting liquid plastic molding material from outside of said cavity plate into said female cavity when either said first insert plate or said second insert plate is compressed between said core side and said cavity side.

14. The method of claim 13 further comprising: compressing said core side against said cavity side using said electric motor until said liquid plastic material is evenly distributed throughout said female cavity.

15. The method of claim 13 wherein said heating of said first insert plate and said second insert plate is different from heating said liquid molding materials.

16. The method of claim 9 further comprising positioning said induction coil outside a space of said core side and said cavity side.

17. The method of claim 9 further comprising positioning said induction coil sufficiently close to said first insert plate or said second insert plate when either said first insert plate or said second insert plate is rotated outside of said female cavity and said male protrusion.

18. The method of claim 9 further comprising securing a first molding pattern to said first insert plate.

19. The method of claim 9 further comprising securing a second molding pattern to said second insert plate.

20. The method of claim 9 further comprising connecting said first insert plate and second insert plate by a rotating arm having a length L and a pivot that is coupled to said electric motor.

* * * * *